United States Patent [19]
Allaire et al.

[11] Patent Number: 6,018,152
[45] Date of Patent: Jan. 25, 2000

[54] METHOD AND DEVICE FOR DE-ICING CONDUCTORS OF A BUNDLE OF CONDUCTORS

[76] Inventors: Marc-André Allaire, 60 rue Valin, St-Fulgence G0V 1S0, Canada; Jean-Louis Laforte, 246 rue Régent, Chicoutimi G7G 2V7, Canada

[21] Appl. No.: 09/290,811

[22] Filed: Apr. 13, 1999

[51] Int. Cl.[7] ................................................ H05B 1/02
[52] U.S. Cl. ........................ 219/501; 307/147; 307/41; 361/1; 219/486; 219/485; 219/508; 219/494
[58] Field of Search .................... 219/483–486, 219/501, 507, 508, 505, 209, 481, 494; 307/38–41, 34, 117, 141, 147; 361/1

[56] References Cited

U.S. PATENT DOCUMENTS

| | | | |
|---|---|---|---|
| 2,797,344 | 6/1957 | Peirce | 307/147 |
| 2,870,311 | 1/1959 | Greenfield et al. | 219/19 |
| 3,316,344 | 4/1967 | Kidd et al. | 174/106 |
| 3,316,345 | 4/1967 | Toms et al. | 174/126 |
| 4,082,962 | 4/1978 | Burgsdorf et al. | 219/209 |
| 4,085,338 | 4/1978 | Genrikh et al. | 307/147 |
| 4,119,866 | 10/1978 | Genrikh et al. | 307/147 |
| 4,135,221 | 1/1979 | Genrikh et al. | 361/1 |
| 4,920,252 | 4/1990 | Yoshino | 219/497 |

OTHER PUBLICATIONS

Fujurika Technical Review, "Removal of Icy Snow Accumulation on the Transmission Line by applying LC–Spiral Rod" Fujikara Technical Review, No. 16, 1987.

Manitoba Hydro, << Atelier sur la gestion des tempêtes de verglas>>, Association canadienne de l'Électricité, ACE, Édition de février 1993, 90 pages.

*Primary Examiner*—Mark Paschall
*Attorney, Agent, or Firm*—Ware, Fressola, Van Der Sluys & Adolphson LLP

[57] ABSTRACT

A method and device for removing ice from overhead conductors of a bundle of conductors or preventing an accumulation of ice on these conductors. The method includes forcing the entire current load of the line in one or a portion of the conductors, the excessive power dissipated in this manner de-ices the conductor by Joule heating. The method is repeated for different conductors of the bundle until they have all been de-iced or for the entire duration of an ice storm. Electric power units are provided on each conductor to control the current circulation as needed, and a command module controls the entire system. Conducting elements are provided at the beginning and at the end of the line to allow a distribution of the current as needed.

23 Claims, 5 Drawing Sheets

METHOD AND DEVICE FOR DE-ICING CONDUCTORS OF A BUNDLE OF CONDUCTORS

FIELD OF THE INVENTION

The invention relates to a method and a device for sequentially de-icing the conductors of a bundle of conductor through heating.

BACKGROUND

In cold regions, ice storms cause melted snow, ice and frost to accumulate on conductors of transmission lines. The weight of such icy deposits adds to the wind charge and increases the mechanical tension in the conductors, which may cause the cables to sag excessively or break. These problems are particularly significant with regard to single conductor cables and to bundles of such conductors. Bundles of conductor cables comprise a plurality of individual conductors, usually spaced-apart or separated from each other by means of spacers to provide better electrical characteristics.

A limited number of de-icing methods have been developed and used by electric utilities to counteract and prevent the formation of ice on high voltage power line cables. Conventional practices for avoiding or limiting the formation of ice generally comprise mechanically shocking the conductors or passing high or short circuit currents trough the lines. Mechanical methods involve miscellaneous de-icing tools and rollers which most of the time are used after the ice storms. These methods are generally used for ad-hoc de-icing operations in the field and require very expensive workmanship. High and short circuit current methods consist of heating lines sufficiently to prevent heavy ice formation and to cause ice already present to fall off. For this purpose, either the normal supply transformers are used in special connection, or the current from special transformers replaces the current of the line itself. Such practice has certain inherent disadvantages, particularly to the needed current load, which requires an enormous amount of power to raise the temperature sufficiently to cause the ice deposit to melt at the cable interface and then shed. Often, the current supplying capacity of the transmission system is insufficient to accomplish this task and excessively large and expensive auxiliary transformers are then required. This method is also inconvenient in that the line operation must be interrupted to carry it out.

Another limitation of the already developed thermal methods mentioned above comes from the phase stability of the line, which shall be maintained and assured during its operation. For example, with actual 735 kV power lines involving bundles of four 35 mm conductors, load current per phase shall be kept below 1760 A to maintain phase stability, so that the maximal current circulating into each sub-conductor cannot exceed 440 amperes. This intensity is much too low for removing any ice from these conductors by Joule effect.

Known in the art are U.S. Pat. Nos. 4,119,866 (GENRIKH et al) 4,085,338 (GENRIKH et al) 4,135,221 (GENRIKH et al) which disclose thermal de-icing methods using high current or short circuits. These patents describe methods applicable to de-icing of high voltage lines by short-circuiting the electrical conductors in which a DC current is injected. This operation however requires that the line be interrupted before being connected to the special auxiliary transformers and rectification units of the DC power supplies.

As can be seen, even if the effectiveness of power line de-icing by using high currents and short circuits is well recognized, all the methods developed up to now have the disadvantage of being very expensive, requiring large power equipment, and necessitating an interruption of the current circulation in the line during the de-icing operation, thereby interrupting service to customers.

Also known in the art are U.S. Pat. Nos. 3,316,344 (KIDD et al) and 3,316,345 (TOMS et al), which both disclose an autonomous de-icing method consisting of heating overhead conductors by wrapping them with sets of wires and rods made of a ferromagnetic alloy material having a low Curie Point. In this particular method, the heat is generated by Foucault currents induced within the ferromagnetic wires by the AC current of the transmission line. The weight of the wires is a general function of the temperature and wind conditions. Even if these electromagnetic heating wires operate autonomously with great reliability, since there are no mobile parts, and without any service interruption, they have the major disadvantage of consuming energy all year long because they continually dissipate heat, even if the heating decreases by 20% at temperatures over 20° C. (Fujukura, 1987). For that reason, this system cannot be used economically for de-icing a whole line; its actual use is limited to melting wet snow of very short sections of line, as those at cross-roads. For a de-icing system of this type to be effective under severe freezing rain conditions (−5° C. and 15 m/s), it would require about ten times more energy than the existing system used for melting snow.

U.S. Pat. No. 2,870,311 (GREENFIELD and al) discloses a system involving a specially built cable which can be de-iced by Joule effect. For that purpose, two electrical circuits have been integrated within the cable: one with a low electrical resistance, which is used under normal operation, and the second with a greater resistance, which has the ability of de-icing the cable by Joule heating. During an ice storm, the low resistance circuit has to be changed to the high resistance one. This circuit transfer requires special equipment. In addition, this system requires the replacement of existing cables by new ones which are completely different and thus more expensive to manufacture. The circuit transfer also requires a brief interruption of the line current. To our knowledge, this system has not yet been applied to a transmission line.

Finally, U.S. Pat. No. 2,797,344 (PEIRCE) discloses an apparatus and a method for de-icing two coaxial electric cables. Peirce teaches providing the outer cable with a gap and an electrical bridge to fill this gap. When the ice accumulation on the line reaches a certain value, the electrical bridge is mechanically triggered to free the gap, thereby interrupting the current circulation in the outer cable. The two cables being electrically connected, the entire load of the line is transferred to the inner cable, which generates enough heat to de-ice both cables. The apparatus and method according to this patent are however only applicable to coaxial conductors having appropriate electrical properties.

OBJECT AND SUMMARY OF THE INVENTION

An object of the present invention is to provide a simple and effective method for de-icing all the conductors of a bundle when needed.

Another object of the invention is to provide such a method that is autonomous and is carried out without any interruption of the line operation.

Still another object of the invention is to provide a method for continually removing ice from the conductors of a bundle during severe ice storms.

Still another object of the present invention is to provide an apparatus adapted to carry out such a method.

In accordance with the invention, there is provided a method for de-icing conductors of a bundle of conductors. The method comprising the following steps:

(a) supplying a total current load in the bundle of conductors, the total current load being distributed between all the conductors of the bundle;

(b) selecting at least one of the conductors for de-icing;

(c) blocking, for a period of time, current circulation in conductors which have not been selected in step (b) at a given location along the bundle of conductors;

(d) re-routing for the same period of time the total current load upstream the given location in the at least one of the conductors;

(e) redistributing the current load between all the conductors downstream said given location, and (f) returning to step (a).

In this manner, the at least one of the conductors are de-iced by heating.

In accordance with the invention, there is also provided a method for de-icing conductors of a bundle of conductors, each conductor being provided with an electric power unit and the electric power units being controlled by a command module. The method comprises the following steps:

(a) supplying a total current load in the bundle of conductors, the total current load being distributed between all the conductors of the bundle;

(b) monitoring a climatic condition in the vicinity of the bundle of conductors to detect an ice storm;

(c) when the ice storm is detected, sending a triggering signal to the command module. The command module then carrying on the sub-steps of:

(i) selecting at least one of the conductors for de-icing;

(ii) sending a signal to power unit corresponding conductors which have not been selected in step (i) to block, for a period of time, current circulation in said corresponding conductors at a given location along the bundle of conductors;

(iii) re-routing for the same period of time the total current load upstream the given location in the at least one of the conductors;

(iv) redistributing the current load between all the conductors downstream said given location; and (v) returning to sub-step (i), The sub-steps (i) to (v) are repeated until the end of the ice storm; the method finally comprises a step (d) of returning to step (a).

In accordance with the invention, there is further provided a de-icing device for conductors of a bundle of conductors carrying a total current load distributed between the conductors.

The device comprises an electric power unit for each of the conductors of the bundle. The electric power unit is adapted to regulate the current circulation in the corresponding conductor. The device also comprises a first and a second connecting means, each electrically connected to each conductor of the bundle. The first connecting means is located proximate to a first end of said bundle of conductors upstream of the electric power units. The second connecting means is located proximate to a second end of said bundle downstream the electric power units.

The device further comprises controlling means. The controlling means are adapted to repetitively select at least one of the conductors for de-icing, and send a signal to the electric power units corresponding to the conductors not selected for de-icing to stop current therein for a period of time. In this manner, during this period of time the total current load is re-routed through the first connecting means to circulate in the at least one of the conductors. The total current load is redistributed between all the conductors through the second connecting means. The circulation of the total current load in the at least one of the conductors heats it to remove ice thereon.

Advantageously, the method and device according to the present invention may be applied to existing conductor bundles of actual power lines while energized and during ice storms, and does not require any interruption of service to clients.

Further, the method according to the invention is effective for ice removal of all types of ice and sleet deposits, as these are formed under freezing rain, in-cloud icing, and wet snow. Moreover, it uses the current load of the line itself, without having to increase the total power supply to the line.

The present method and device are further advantageous in that the system may be completely automatized, autonomous, and without requiring significant workmanship. The device according to the invention can be installed on actual line sections of any length without disturbing the network, and it does not require a heavy or special infrastructure.

The present invention and its advantages will be better understood upon reading the following non restrictive description of a preferred embodiment thereof, with reference to the accompanying drawings.

DESCRIPTION OF A PREFERRED EMBODIMENT

Figure 1:
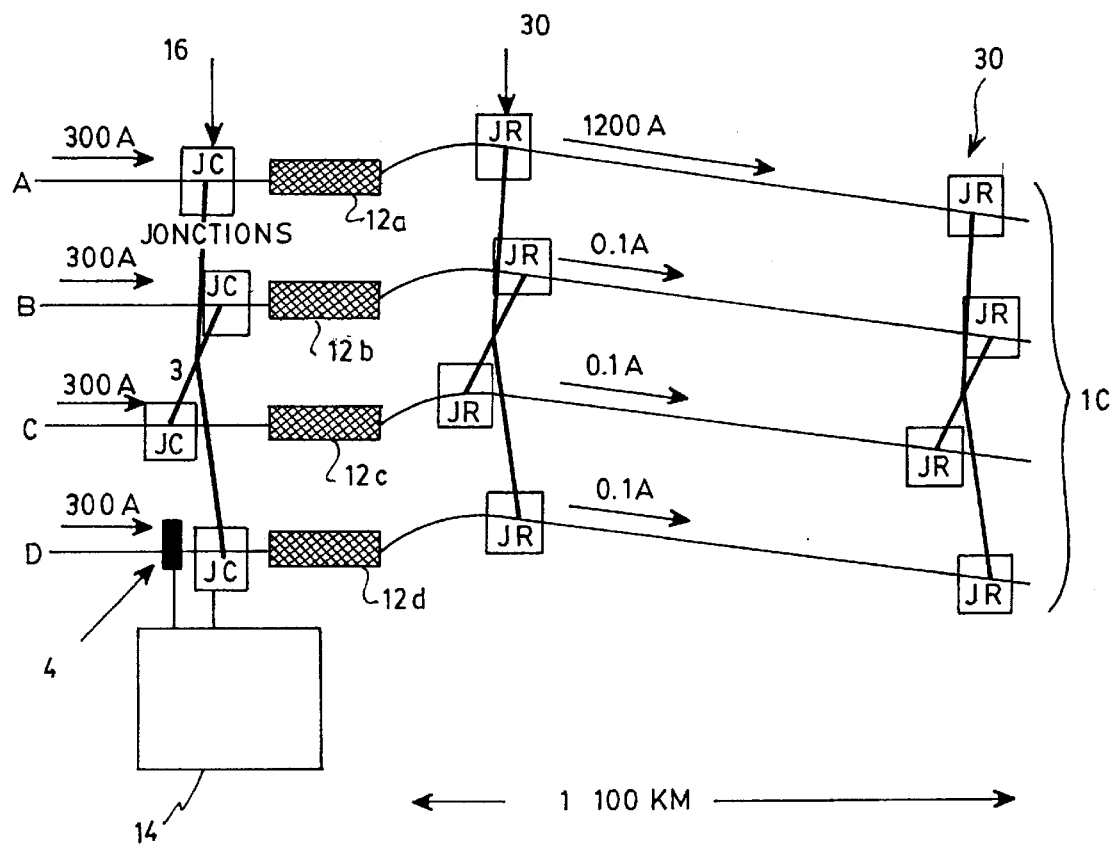
FIG. 1 is a diagram showing a preferred embodiment of the present invention.

Description of a method according to a preferred embodiment of the present invention FIG. 1 illustrates a method of de-icing conductors A, B, C and D forming a bundle of conductors 10, in accordance with an embodiment of the present invention. The bundle 10 may be part of a transmission line including a plurality of such bundles. It is understood that although bundle 10 is here shown as including four conductors, the method and device of the present invention may be applied to any group of two conductor or more as long as they are electrically connected together.

The method includes a first step (a) of supplying a total current load in the bundle of conductors 10, the total current load usually being distributed evenly between all the conductors of the bundle 10. This basically constitutes the normal operation of the line. Examples of various current values for the current load in typical conductors of bundles in transmission lines will be given below.

Step (b) of the present method involves selecting at least one of the conductors of the bundle for de-icing. Preferably, a single conductor may be selected each time the method is carried out, to maximize the heating effect.

The method next includes a step (c) of blocking, for a period of time, the current circulation in all the conductors which have not been selected in step (b). This blocking is done at a given location along the bundle of conductors, preferably by activating a series of electric power units (12a,12b,12c,12d), each conductor of the bundle being provided with one of these electric power units. Preferably, all the electric power units (12a,12b,12c,12d) are controlled by a single command module 14. Also preferably, the command module may receive a triggering signal and activate the desired electric power units upon receipt of this signal.

The method also includes a step (d) of re-routing, for the same period of time, the total current in the conductor or conductors to be de-iced. The re-routing is done at a location upstream the given location along the bundle where the current circulation has been blocked in the other conductors, preferably close to the beginning of the conductors near a support tower. A first conducting member 16, electrically connected to each of the conductors, may be provided for this purpose. In this manner, all the current load circulates in the conductor or conductors to be de-iced, effectively heating it.

In accordance with step (e) of the present method the current load is redistributed between all the conductors at a location downstream said given location, preferably close to the end of the conductors near the next support tower. The re-routing may be done through a second conducting member (not shown) similar to the first one. The conductor or conductors are therefore de-iced over the entire length of cable extending between the first and the second conducting members.

The method finally comprises returning to step (a) for a new de-icing cycle. By choosing different conductors to be de-iced at each cycle, all of the conductors may be de-iced in sequence. If the transmission line is subject to an event such as an ice storm, the method may advantageously be repeated for as long as the storm is raging, effectively preventing a damaging accumulation of ice on each of the conductors.

In another variant, the selection of step (b) may be influenced by relevant data, such as for example the temperature of the conductors. Step (b) may therefore include a sub-step of measuring a temperature value for each conductor, and then basing the choice of conductors to be de-iced on the obtained temperature values. Similarly, the de-icing period of time may be chosen with respect to the same temperature values.

The capacity of de-icing for a conductor depends on the intensity of the current flowing into it. This intensity is limited to the "nominal thermal capacity" of the conductor, which is the maximum current allowed in a conductor. This factor is a function of the maximum temperature allowed for line operation. For reasons of clearance over the ground and having line spans as long as possible, nominal current capacity of cables of 735 kV line is generally limited to a temperature of 49° C. However, these cables can withstand a temperature of 95° C. without major damages. Indeed, the same cable used on 735 kV lines is also used with a nominal thermal capacity of 95° C. on 315 kV and lower voltage lines, for which the clearance is not a problem.

The values of the current corresponding to the maximal thermal capacity at 49° C. and 95° C. are shown in Table 1 for four different sizes of conductors commonly used. Values of 795 and 1361 MCM correspond to cables of around 25 and 35 mm in diameters respectively. Table 1 also shows the current values used in practice for both de-icing ice accumulation preventing purposes. On the basis of these numbers, the four cables can be used with a nominal thermal capacity of 95° C., so that they can withstand without any damage, the high current increase required for de-icing operations during ice storms, when temperatures are below 0° C.

TABLE 1

CURRENTS USED FOR ANTI-ICING AND DE-ICING WITH FOUR CABLE SIZES

A) ANTI-ICING MODE (BPA: Boneville Power Administration 1930–1974)

| Conductor MCM | BPA +50% $T_e = 75°$ C. $T_a = 25°$ C. | Thermal Capacity $T_e = 49°$ C. $T_a = 0°$C. | Thermal Capacity $T_e = 95°$ C. $T_a = 0°$ C. |
|---|---|---|---|
| 795 | 485 A | 975 A | 1360 A |
| 864 | 500A | 1010 A | 1410 A |
| 1033 | 565 A | 1145 A | 1605 A |
| 1361 | 655 A | 1320 A | 1850 A |
| %* | | 66% | 47% |

*% = ratio of the anti-icing current to the nominal thermal capacity

B) DE-ICING MODE (BPA and Manitoba Hydro 1993)

| Conductor MCM | BPA +125% $T_e = 75°$ C. $T_a = 25°$ C. | MANITOBA HYDRO[1] $T_e = 70°$ C. $T_a = 0°$ C. | Thermal Capacity $T_e = 49°$ C. $T_a = 0°$ C. | Thermal Capacity $T_e = 95°$ C. $T_a = 0°$ C. |
|---|---|---|---|---|
| 795 | 1205 A | 1165 A | 975 A | 1360 A |
| 864 | 1248 A | 1217 A | 1010 A | 1410 A |
| 1033 | 1417 A | 1380 A | 1145 A | 1605 A |
| 1361 | 1633 A | 1595 A | 1320 A | 1850 A |
| %* | | | ≈122% | ≈87% |

*% = ratio of the de-icing current to nominal thermal capacity at 49° C. and 95° C.
[1]for a 12 mm of ice at −10° C. in a wind of 3 m/s (MANITOBA-HYDRO, 1993)
$T_e$: cable external surface temperature
$T_a$: air temperature Case of a 735 kV 3 phase line section (bundles of 4 conductor of 35 mm in diameter)

From the data of table 1, the de-icing and anti-icing practice of two utilities, BPA and Manitoba Hydro, is to raise the current circulating into each sub-conductor to an intensity ranging between 655 to 1633 A. With actual 735 kV lines, the current load averages 1200 A per phase, which corresponds to 300 A per sub-conductor, each sub-conductor dissipating 56 W/m² corresponding to 256 W/m² for the whole bundle. In the system of this invention, the whole current load of 1200 A is injected into one sub-conductor. The power dissipated into it then increases from 56 W/m² (corresponding to 300 A) to 896 W/m² (corresponding to 1200 A). This value is 4×4=16 times larger than the power usually dissipated by one sub-conductor during normal line operation, the power increasing according to the square of the current intensity. This power is sufficient to remove the ice under moderate to severe icing conditions. In heavy ice storms, it is possible to raise the load current to 4×440 A=1760 A, (for reasons of stability, this value can not exceeded). Then the power dissipated would be increased by 1.47×1.47=2.16 times to a value of 1935 W/m².

Case of a 315 kV 3-phase line with 2 and 4 conductor bundles

The same principle applies to lines under 735 kV, as 315 kV ones and under. Depending on the number of sub-conductors in the bundle, when the current load is injected into one conductor, the power dissipated will be increased by 4×4=16 (case of 4 conductor bundles) or by 2×2=4 (case of 2 conductor bundles). With 315 kV lines having bundles of two cables of 35 mm in diameter, the load current per phase is of 1200 A, given 600 A circulating into each conductor. In the last case, when the total load current of 1200 A is injected into a single sub-conductor, the power dissipated increases from 2×112 W/m2 (corresponding to 600 A) to 896 W/m2 (corresponding to 1200 A). This heating condition is the same as the one described in the preceding section for the 735 kV line. As mentioned before, this power is sufficient for de-icing a sub-conductor under moderate to severe icing conditions. It is possible, as with the 735 kV lines, to increase the current load to the nominal capacity of these cables at 95° C. Knowing the main variables (air temperature and wind conditions), it is possible to adjust the power required for de-icing so as to select the optimal heating times and sequences.

Example of application of the method according to the invention

In the method proposed in this invention, at the beginning of the ice storm, or a short time before (15–20 minutes would be sufficient), command modules of each bundle are activated by an ice detector signal or by phone liaison, in order to trigger the electronic power units to the selected level of current to be injected into each sub-conductor.

In the scenario of the most severe icing conditions (for example, freezing rain at –6° C. and 55 km/h having an icing intensity of 4 mm/h), the whole line current load bundle is forced to circulate into a single conductor at the beginning of the ice storm. This conductor is then heated during a selected period of time (let us say 30 min) until its surface temperature rises slightly over 0° C., at which temperature the ice deposit partly melts at cable interface to fall off the conductor. During that period of time, the ice formed on other non-heated sub-conductors is 2 mm. After heating the first sub-conductor, the command module automatically initiates the heating of a second conductor for 30 min. After these two first heatings, the first de-iced conductor is covered with 2 mm of ice, the second with 0 mm, the third and the fourth with 4 mm. After the third heating sequence of 30 minutes, the first de-iced conductor is covered with 4 mm, the second with 2 mm, the third with 0 mm and the fourth, with 6 mm. At the end of the first sequence of 2 hours, all four conductors have been de-iced once, and the maximum thickness of ice deposits is of 6 mm.

| Sequence #1 (2 hours) | | | | |
| --- | --- | --- | --- | --- |
| First heating (30 min) | 0 | 2 | 2 | 2 |
| Second heating (30 min) | 2 | 0 | 4 | 4 |
| Third heating (30 min) | 4 | 2 | 0 | 6 |
| Fourth heating (30 min) | 6 | 4 | 2 | 0 |
| Sequence #2 (2 hours) | | | | |
| First heating (30 min) | 0 | 6 | 4 | 2 |
| Second heating (30 min) | 2 | 0 | 6 | 4 |
| Third heating (30 min) | 4 | 2 | 0 | 6 |
| Fourth heating (30 min) | 6 | 4 | 2 | 0 |

After the first sequence of about 2 hours, the alternate heating sequence is repeated up to the end of the ice storm. The regulation of all the units of a conductor bundle in the appropriate heat sequencing may be done automatically by a microprocessor. At the end of the ice storm, power units are returned to their normal mode and the load current charge is distributed evenly to each sub-conductor.

In the described scenario, the duration times of alternate sequences of heating are assumed to be equal. In real ice storms, the values can be different, being automatically adjusted by the microprocessor in what are logged real time temperature readings of sub-conductors exposed to icing.

The values given in the proposed scenario were verified in experimental tests realized in an icing tunnel where were simulated conditions of temperature and wind representative of severe freezing rain. Under the following conditions: icing intensity of 10 mm per hour, wind speed of 12 m/s and air temperature of –6° C., the measured time of shedding a 10 mm thick elliptic ice deposit formed on a CONDOR (795 MCM) cable of 25 mm in diameter, was found to be 15–20 minutes after the normal current was increased from 250 A to 1000 A.

Description of a device according to an embodiment of the present invention

Figure 2:
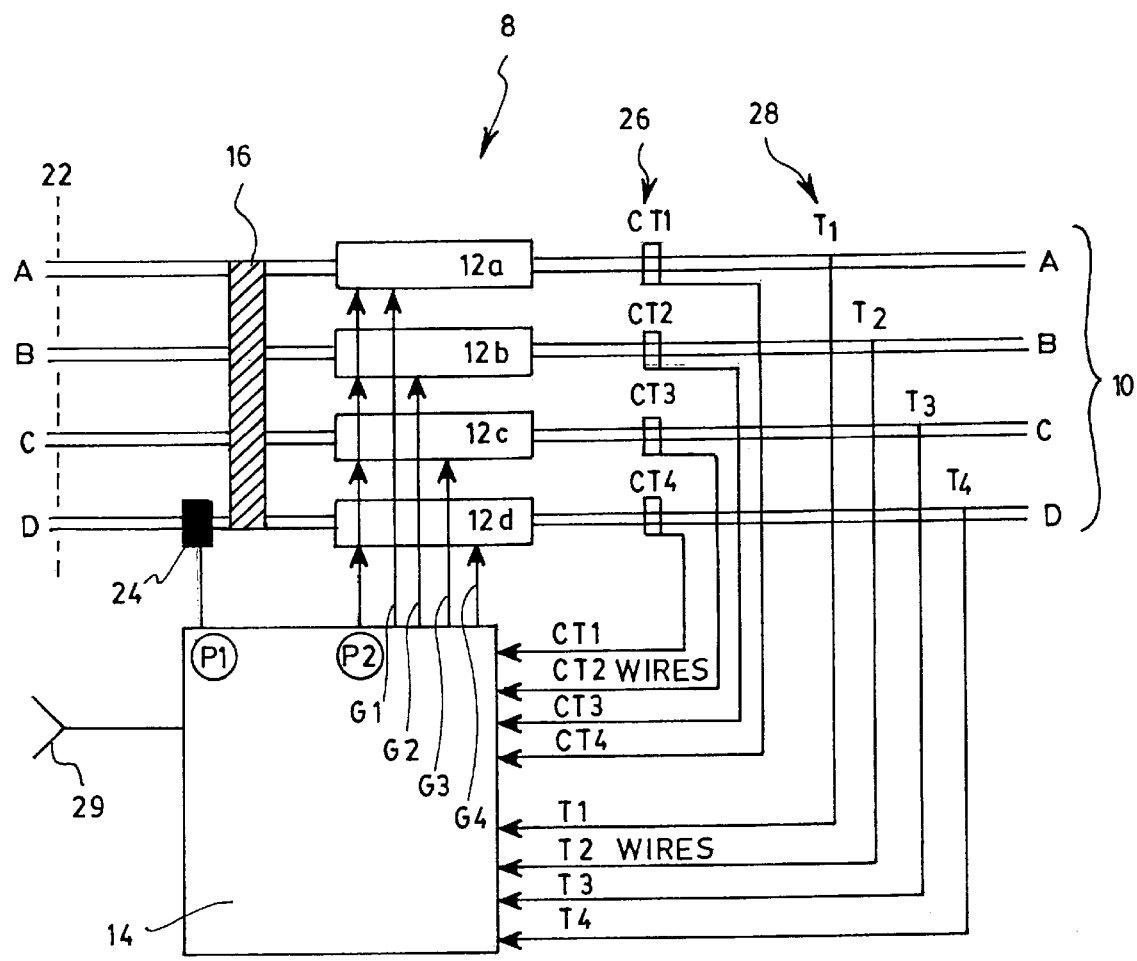
FIG. 2 is a diagram showing the operation of the command module of the embodiment of FIG. 1.

The present invention also provides a device 8 adapted to carry out the steps of the present invention, an embodiment of which is shown in FIG. 2. In this embodiment, the device 8 is used to de-ice four conductors A, B, C, and D, forming a bundle of conductors 10.

Figure 3:
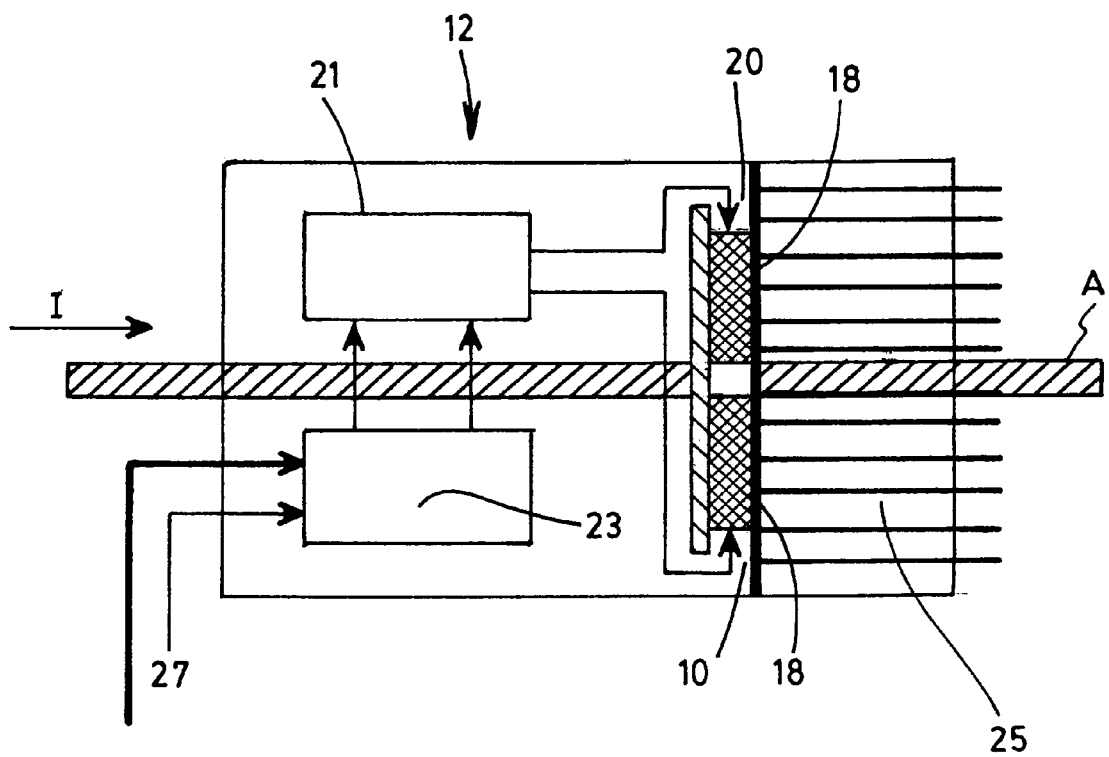
FIG. 3 is a schematic representation of the electric power unit used in the embodiment of FIG. 1.

Referring to FIGS. 1 to 3, the device 8 first includes an electric power unit (12a, 12b, 12c, 12d) for each of the conductors (A, B, C, D) of the bundle 10. Each electric power unit (12a, 12b, 12c or 12d) is adapted to regulate the current circulation in a corresponding conductor (A, B, C or D). The electric power units (12a, 12b, 12c, 12d) may consist of two SCR (Si-Controlled Rectifier), or any equivalent power device such as a MOSFET, a power transistor or a triac. FIG. 3 shows an electric power unit 12 according to the preferred embodiment of the invention, where two SRC 18 are mounted radially on the conductor A. The regulation of current circulating into both SCR 18 is achieved by means of impulse signals trough their gates 20. The electric power units preferably include an impulse generator 21 which is part of the electronic circuit needed for the normal operation of the two SCR 18. The control of the impulse signals imposed to the gates 20 is achieved via triggering unit 23 which receives an activation signal 27 from electronic circuits housed in a command module 14, which will be described thereafter. Each conductor (A, B, C, D) of a bundle 10 is equipped with an electronic power unit 12. For example, in the case of a 735 kV power line with three conductor bundles (one per phase), the de-icing system will comprise 12 electronic power units, i.e. 4 for the 3 conductor bundles. In the case of a 315 kV power line, with three bundles of two sub-conductors, the number of electronic will be reduced to 6 units.

As shown in FIG. 3, the present embodiment of the invention may include a radiant element 25 used to dissipate the heat generated by the high current circulating into both SCR 18 and then limit the temperature below a target value not to be exceeded. For example, under a difference of potential of one (1) volt between an SCR junction and with a current of 1 600 A, an SCR device will dissipate 1 600 Watts.

The illustrated device also includes a first and a second connecting means, here embodied by a first conducting member 16 and a similar second conducting member (not shown), each conducting member having a plurality of extremities each electrically connected to one of the conductors (A, B, C, D) of the bundle 10. The first conducting member 16 is located near a first end 22 of the bundle 10, upstream the electric power units (12a, 12b, 12c, 12d). The second conducting member is located near a second end of the bundle 10, opposite the first end 22 and downstream of the electric power units (12a, 12b, 12c, 12d). The conducting members are adapted to allow the current load phase bundle to be shared out between each of the conductors (A, B, C, D). Special attention should be paid to electrically connecting the extremities of the conducting member to the conductors, since, when the de-icing mode is triggered, the first conducting member has to accommodate at those contact points a current between 4 to 5 times the usual operation intensity.

The device further includes controlling means, here embodied by command module 14. The command module 14 is adapted to repetitively select conductors for de-icing and sends a signal to the electric power units corresponding to the conductors not selected for de-icing, to stop the current in these conductors for a period of time. In this manner, during that period of time, the total current load is re-routed through the first conductive member 16 to circulate in the conductor or conductors to be de-iced, thereby effectively heating it. The total current load is redistributed between all the conductors through the second conducting member In this manner, the selected conductors are de-iced by heating.

Referring to FIG. 2, the command module is preferably a device containing the electronic circuits required to trigger the SCR of the electric power units to change their conductive mode to the non-conductive one. As may be seen in FIGS. 1 and 2, the command module is preferably powered directly from the transmission line by means of a current transformer 24 installed on one, preferably the closest, of the conductors of the bundle.

The SCR triggering is achieved by means of a microprocessor having inside the "expert" software for reading, in real time, the following measures: sub-conductor temperatures and currents, icing rates from the ice detector, etc. Temperatures and currents are measured by means of an appropriate temperature sensor (26a, 26b, 26c, 26d) and a small current transformer (28a, 28b, 28c, 28d) attached to each conductor (A, B, C, D) of the bundle 10. The command module may be housed in a special container hanging directly under the insulator units holding the conductor bundles 10.

The controlling means may further include an antenna 29 connected to the command module. Through this antenna instructions may be sent to the command module for modifying or replacing the parameters of the "expert" software via appropriate electromagnetic radio waves. External communications with the control module can also be achieved in the same way, to know in real time the status of its functions, level of activity, real time sensor readings, etc. A ground ice detector may also be used, equipped with a transmitter to signal by radio, via the command module, the beginning and the end of an ice storm. The radio communication allows the system to be operated autonomously and automatically while all components are at the high voltage of the line. Radio allows communication with the microprocessor housed in the command module and then obtains all information required for the operation of the system, like for instance, off and on remote activation of power units, in-time icing rates, sub-conductor current and temperature, etc. The use of radio communication avoids all problems related to ground contacts.

Figure 4:
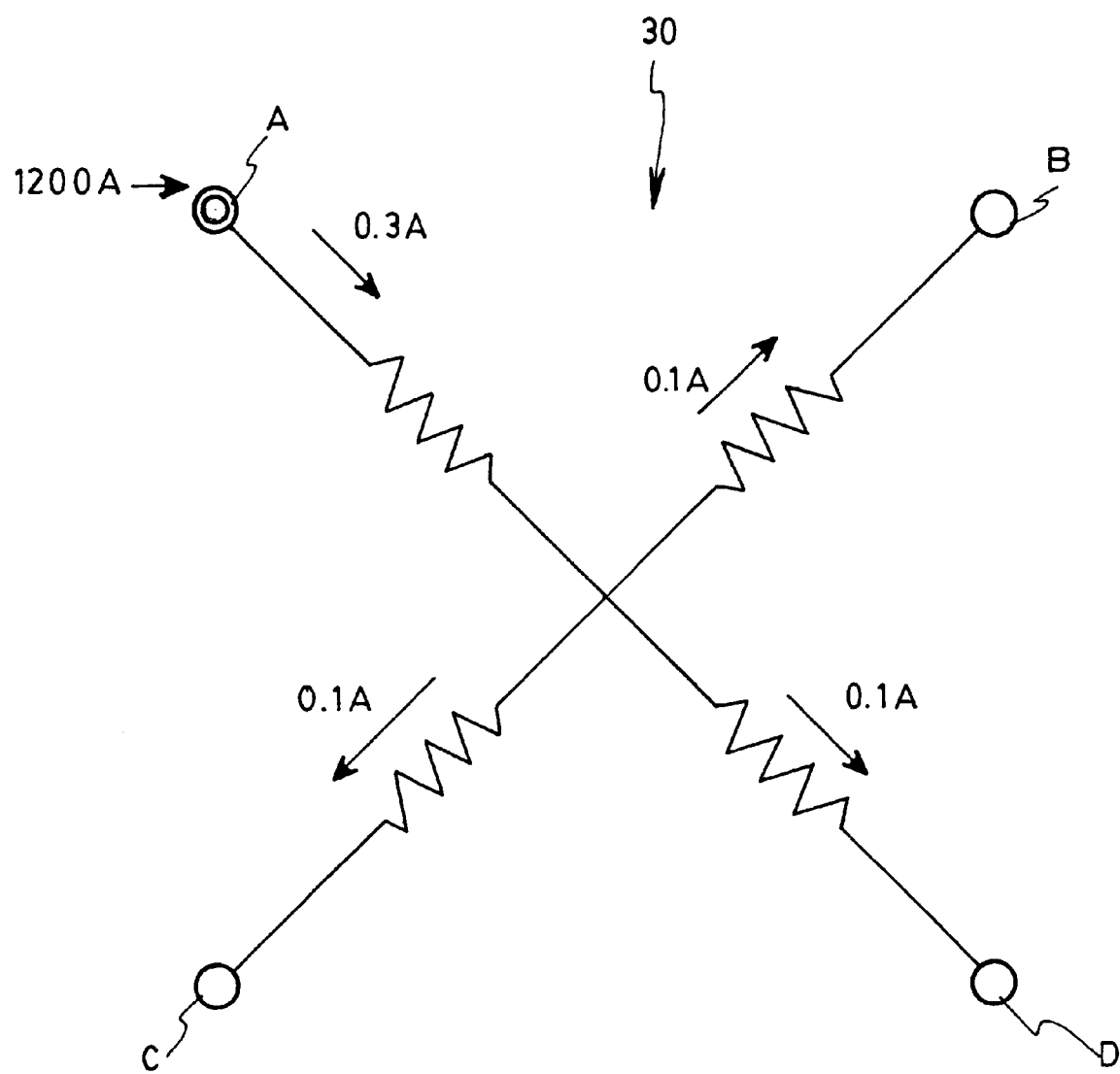
FIGS. 4 and 5 are respectively a schematic representation and a side view of a spacer used to hold the conductors of the bundle of conductors shown on FIG. 1.
Figure 5:
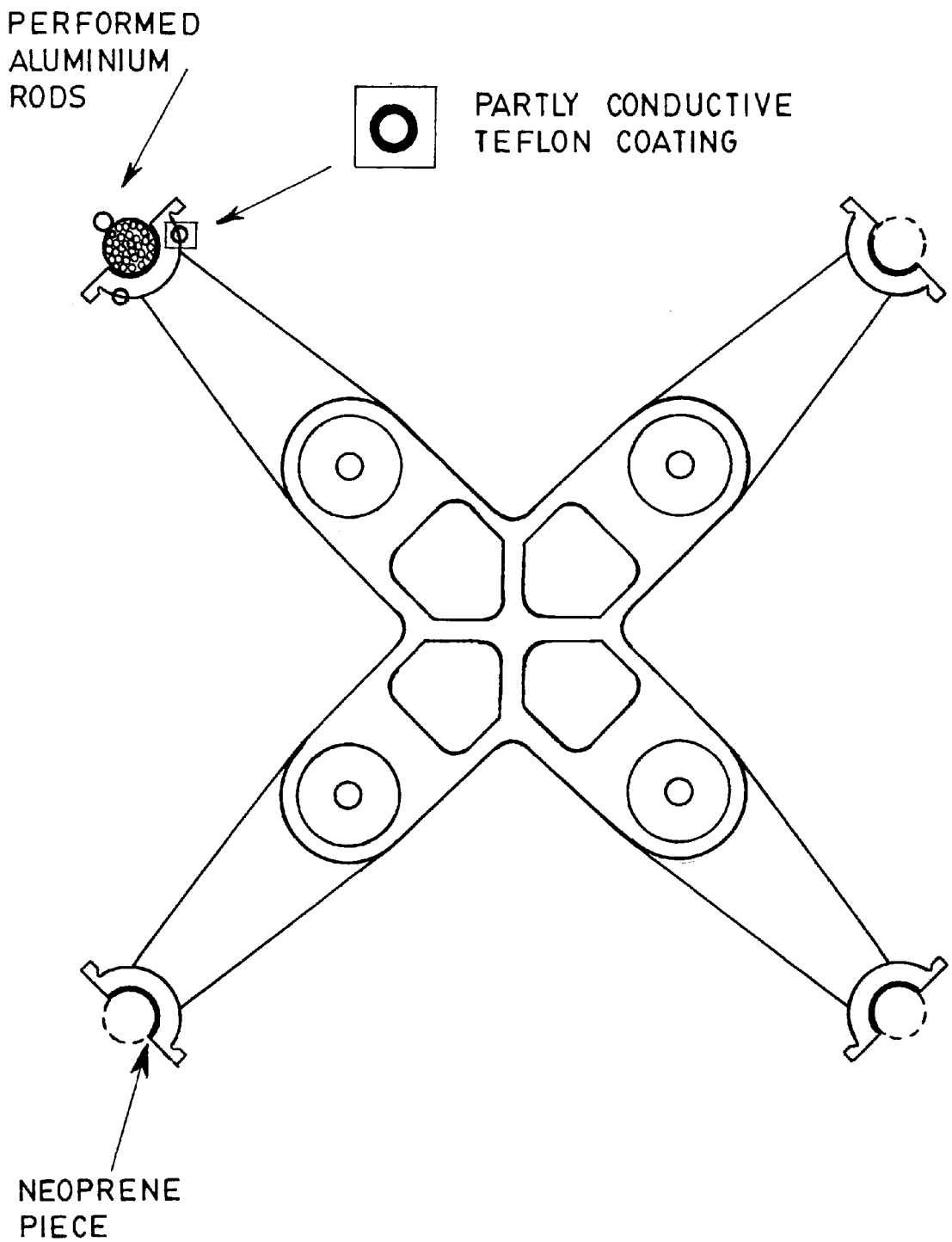

Referring to FIGS. 1, 4 and 5, the device 8 may also include a plurality of generally resistive spacers 30. The function of this particular component is opposite to that of the conducting member 16, as it insulates each conductor (A, B, C, D) of the bundle 10 from the others (A, B, C, D). As the electric power units (12a, 12b, 12c, 12d) of a bundle 10 can support only a potential difference of a few kilovolts between each other, they have to be maintained at the same potential as the line, no matter the mode of conduction imposed by the command module 14. For that purpose, the spacers may be provided with an electrical resistance sufficiently large to let a small current circulate, not exceeding 0.1 A. By maintaining the high voltage at the line voltage, there will be no appreciable change in the line current load. There will also be no change in the voltage phase of the line by comparison with the other parts without the system. The number of spacers required for the system is function of the length of the line section, which is to be equipped with this system. The practice for a 3-phase line section having 4-conductor bundles is to install 17 tie-pieces per km of length. Thus, for three phase lines (one conductor bundle per phase), the number of spacers required will be of 3×17=51 units per km. The insulation at the junctions of the spacers with each conductor may be done by using a coating or a foil of an appropriate resistive substance, or by selecting for its fabrication a particular material (like for example, a partially conductive fibre-glass or any appropriate type of material). Usually, conductors are covered by a thin piece of neoprene, as shown in FIG. 5, before being attached to the extremities of the spacers by using three pre-formed aluminium rods. Spacers already used in the field can easily be adapted for this de-icing application, by using semi-insulated pre-formed aluminium rods, especially anodized or coated with a teflon film made partly conductive by an appropriate addition of black power powder. This may contribute to a reduction of the cost of the implementation of this system to actual lines.

As may easily be appreciated, the method and device of the present invention offer many advantages over the prior art. The method is applicable to existing bundles of conductors of actual high voltage power lines. By using all of the already existing current load in the line, the high amount of current required for an effective de-icing by Joule heating of each conductor may be provided, (for instance, up to 1200–1700 A can be obtained in this way in the case of a 735 kV line). By limiting the application of the method described hereinabove to the duration of ice storms, the energy consumption is minimized. The device does not require very expensive auxiliary pieces of equipment, all components being maintained to the line voltage. It does not need the replacement or the modification of existing cables, and does not command excessive amounts of power especially when the de-icing is activated only during ice storms. The device can be applied to lines of any length. The ice removal system does also not require line interruption, so that service to clients is maintained during the whole de-icing operation.

Of course, numerous modifications may be made to the preferred embodiment disclosed hereinabove without departing from the scope of the invention as defined in the appended claims.

What is claimed is:

1. A method of de-icing conductors of a bundle of conductors, comprising steps of:
   (a) supplying a total current load in the bundle of conductors, the total current load being distributed between all the conductors of the bundle;
   (b) selecting at least one of the conductors for de-icing;
   (c) blocking, for a period of time, current circulation in conductors which have not been selected in step (b) at a given location along the bundle of conductors;
   (d) re-routing for the same period of time the total current load upstream the given location in the at least one of the conductors;
   (e) redistributing the current load between all the conductors downstream said given location, and
   (f) returning to step (a),
   whereby said at least one of the conductors are de-iced by heating.

2. A method according to claim 1, wherein steps (a) to (f) are carried out a plurality of times, and wherein different at least one of the conductors are selected every consecutive time in step (b) until all the conductors have been de-iced.

3. A method according to claim 2, wherein a single conductor is selected each time.

4. A method according to claim 1, wherein the method is carried out during the whole duration of an ice storm.

5. A method according to claim 1, wherein step (b) comprises measuring a temperature value for each conductor, the at least one conductor being selected based on said temperature values.

6. A method according to claim 5, further comprising an additional step between steps (b) and (c) which comprises determining the period of time based on said temperature values.

7. A method according to claim 1, wherein the blocking of step (c) is carried out by electric power units, each of said electric power units being connected to one of said conductors of the bundle.

8. A method according to claim 7, wherein the electric power units are controlled by a command module.

9. A method according to claim 8, comprising an additional step between steps (b) and (c) which comprises sending a triggering signal to the command module, the command module activating the blocking of step (c) upon reception of said triggering signal.

10. A method according to claim 7, wherein:
the re-routing of step (d) is carried out through a first conducting member electrically connected to each of the conductors of the bundle at a location upstream the electric power units; and
the redistributing of step (e) is carried out through a second conducting member electrically connected to each of the conductors of the bundle at a location downstream the electric power units.

11. A method for de-icing conductors of a bundle of conductors, each conductor being provided with an electric power unit, the electric power units being controlled by a command module, the method comprising steps of:
(a) supplying a total current load in the bundle of conductors, the total current load being distributed between all the conductors of the bundle;
(b) monitoring a climatic condition in the vicinity of the bundle of conductors to detect an ice storm;
(c) when the ice storm is detected, sending a triggering signal to the command module, said command module then carrying on the sub-steps of:
(i) selecting at least one of the conductors for de-icing;
(ii) sending a signal to power unit corresponding conductors which have not been selected in step (i) to block, for a period of time, current circulation in said corresponding conductors at a given location along the bundle of conductors;
(iii) re-routing for the same period of time the total current load upstream the given location in the at least one of the conductors;
(iv) redistributing the current load between all the conductors downstream said given location; and
(v) returning to sub-step (i),
said sub-steps (i) to (v) being repeated until the end of the icing event; and
(d) returning to step (a).

12. A de-icing device for conductors of a bundle of conductors, the bundle of conductors carrying a total current load distributed between them, the device comprising:

an electric power unit for each of the conductors of the bundle, said electric power unit being adapted to regulate a current circulation in a corresponding conductor;
first and a second connecting means each electrically connected to each conductor of the bundle, the first connecting means being located proximate a first end of said bundle of conductors upstream the electric power units, and the second connecting means being located proximate a second end of said bundle downstream the electric power units; and
controlling means adapted to repetitively select at least one of the conductors for de-icing and send a signal to the electric power units corresponding to the conductors not selected for de-icing to stop the current therein for a period of time, so that during said period of time, the total current load is re-routed through the first connecting means to circulate in the at least one of the conductors, the total current load being redistributed between all the conductors through the second connecting means, the circulation of the total current load in the at least one of the conductors heating said at least one of the conductors to remove ice thereon.

13. A de-icing device according to claim 12, wherein the first and second connecting means each comprise a conducting member having a plurality of extremities, and wherein each conductor of the bundle is electrically connected to one of the extremities.

14. A de-icing device according to claim 12 wherein each electric power unit is chosen from a group consisting of Silicon-Controlled Rectifiers, MOSFETS, power transistors and triacs.

15. A de-icing device according to claim 12, wherein the controlling means comprise a command module controlled by a microprocessor.

16. A de-icing device according to claim 15, wherein the controlling means further comprise a current transformer connected to one of the conductors of the bundle and to the command module, the current transformer using the current circulating in said one of the conductors of the bundle to power the command module.

17. A de-icing device according to claim 15, wherein the controlling means further comprises an antenna connected to the command module, said command module being thereby remotely controllable via radio waves.

18. A de-icing device according to claim 17, wherein the controlling means further comprises:
a ground ice detector for measuring an ice accumulation value in the vicinity of the bundle of conductors; and
a transmitter adapted to transmit the ice accumulation value to the command module via radio waves.

19. A de-icing device according to claim 15, wherein the controlling means further comprise a temperature sensor attached to each conductor of the bundle for measuring a temperature value thereof.

20. A de-icing device according to claim 15, wherein the controlling means further comprise a current transformer attached to each conductor of the bundle for measuring a current value circulating therein.

21. A device according to claim 12, further comprising a plurality of spacers holding the conductors apart from each other, each spacer having a plurality of extremities, each conductor of the bundle being fixed to one of the extremities of each spacer.

22. A device according to claim 21, wherein the spacers each have an electrical resistance sufficiently large to prevent a re-routing of the current load there through.

23. A de-icing device according to claim 12, wherein the controlling means comprises:

a command module controlled by a microprocessor operated by an expert software;

a current transformer connected to one of the conductors of the bundle and to the command module, the current transformer using current circulating in said one of the conductors of the bundle to power the command module;

a temperature sensor attached to each conductor of the bundle for measuring a temperature value thereof, said temperature value being transmitted to the command module;

current measuring means attached to each conductor of the bundle for measuring a current value circulating therein, said current value being transmitted to the command module;

a ground ice detector for measuring an ice accumulation value in the vicinity of the bundle of conductors;

a transmitter connected to the ground ice detector and adapted to transmit the ice accumulation value to the command module via radio waves; and an antenna connected to the command module, said command module being thereby remotely controllable via radio waves, the ice accumulation value being receivable by the command module through said antenna, whereby the command module controls the de-icing device based on the temperature value, the current value and the ice accumulation value.

* * * * *